United States Patent [19]

Kerlin

[11] 4,432,253

[45] Feb. 21, 1984

[54] UNBALANCE COMPENSATOR

[75] Inventor: Jack H. Kerlin, Ann Arbor, Mich.

[73] Assignee: Balance Dynamics Co., Ann Arbor, Mich.

[21] Appl. No.: 342,450

[22] Filed: Jan. 25, 1982

Related U.S. Application Data

[63] Continuation-in-part of Ser. No. 255,477, Apr. 20, 1981, abandoned.

[51] Int. Cl.³ .......................... F16F 15/22; G01B 7/14
[52] U.S. Cl. ............................... 74/573 R; 74/573 F; 51/169; 73/66; 324/208
[58] Field of Search .................. 74/573 R, 573 F; 51/169; 73/66, 458, 468, 487; 301/5 B, 5 BA

[56] References Cited

U.S. PATENT DOCUMENTS

| | | | |
|---|---|---|---|
| 2,322,561 | 6/1943 | Bevins et al. | 74/573 R |
| 3,191,997 | 6/1965 | Colvert | 73/548 |
| 4,096,988 | 6/1978 | Scuricini | 74/573 R |
| 4,292,769 | 10/1981 | Maag et al. | 74/573 R |

Primary Examiner—Leslie A. Braun
Assistant Examiner—Anthony W. Raskob, Jr.
Attorney, Agent, or Firm—Stephenson & Boller

[57] ABSTRACT

A dynamic balancing system for rotary elements wherein balance is maintained by remote control of mass distribution during rotation. A fluid balancing mass partially fills three or more annular chambers. A change in mass distribution is achieved by heating the fluid in a chamber and conducting the vapor so produced to the opposite chamber(s) where the vapor condenses. A warmer chamber thereby loses mass to a cooler chamber. Electronic vibration measuring means and control are generally employed to determine which chambers and what degree of heating are required to improve the state of balance. The preferred control is electronic and comprises a stationarily mounted encoding portion and rotationally mounted decoding portion. Power and encoded control signals are transmitted via inductively coupled coils from the encoding portion to the decoding portion.

35 Claims, 11 Drawing Figures

UNBALANCE COMPENSATOR

REFERENCE TO A RELATED APPLICATION

This application is a continuation-in-part of application Ser. No. 06/255,477, filed Apr. 20, 1981 and now abandoned.

BACKGROUND AND SUMMARY OF THE INVENTION

This invention relates to balancing systems for making repetitive balance corrections on rotary elements of machines that undergo variations of balance during normal operation and wherein imbalance is corrected by remote control while such elements are rotating. Although not so limited, the invention has application to grinders, high-speed lathes and centrifuges which require frequency rebalancing, usually by manual methods.

Certain types of rotating machines undergo changes in their state of balance as a consequence of normal usage. Imbalance gives rise to vibration. Such cases generally require stopping the machine when an unacceptable level of vibration is reached and manually shifting weights to positions indicated by a vibration instrument in order to obtain the desired level of balance. Several cycles of trial spin-ups, measurement, stopping and readjustment are usually necessary because the effect of an adjustment cannot be observed while the adjustment is in progress, but only after the adjustment has been made and the subsequent spin-up and measurement have been observed.

There is a distinct advantage in both reducing procedure time and achieving greater accuracy of balance by performing the weight adjustment while simultaneously monitoring the effects of such adjustment. This procedure involves a balancing device mounted on the machine spindle which is to be balanced wherein mass can be shifted by remote control while the spindle is rotating. Thus a preferred state of balance can be obtained without stopping the machine, and with appropriate control equipment, such a state can be maintained automatically without operator involvement.

A variety of spindle-mounted balancers have been devised over the years intended to simplify and improve upon the accuracy of manual methods. Consideration shall be given to those designed to operate while the spindle is revolving. Such balancers, commonly known as unbalance compensators, can be broadly classified into two categories, (1) mechanical and (2) fluid.

Nearly all mechanical types share one problem in common which is the inability to make both large and fine balance corrections. Large weights necessary for coarse corrections must be minutely adjusted to make fine corrections. Sensitive adjustment of large weighs is even more difficult at high speed due to high centrifugal stresses. Fine balance corrections are easier using small weights, but this limits the correction capacity of the compensator.

Mechanical compensators typically cannot be used on applications where a large through-hole in the device is required. Frequently a shaft, hub or other rotary member must pass through the central portion which is usually occupied with control mechanisms necessary for weight adjustment.

One type of mechanical balancer uses mobile weights such as two or more ball bearings free to roll to any point in a race. Three conditions required for the operation of this device are (1) roundness of the race; (2) concentricity of the race to the geometric or bearing axis; and (3) a "soft" spindle suspension wherein the spindle speed is significantly higher than the resonant frequency of the spindle. Most machine spindles are mounted "hard"; that is the resonant frequency of the spindle is above the normal operating speed, in which case this type of balancer would actually worsen the state of balance. In addition, the inherent rolling resistance of the balls in the race ultimately limits the sensitivity available.

In the category of fluid type compensators, two main classes are found, (1) annular chamber types, and (2) multiple chamber types.

Devices of the first type, after Leblanc U.S. Pat. No. 1,209,730, have an annular tube or channel partially filled with fluid free to communicate everywhere along the annulus. Prerequisite to the function of this balancer is soft suspension of the spindle as described above. Distribution of fluid in the annulus to effect balance correction is directly proportional to displacement of the spindle geometric axis from the rotational axis. Thus the magnitude of correction is proportional to the magnitude of vibration. Balance correction cannot be maintained independent of vibration levels. Such a device can never in principle eliminate vibration but only reduce it through the effect of "mass damping." The "effective mass" added to the spindle acting to reduce vibration is equivalent to the mass contained in a cylindrical disk of a diameter and width described by the fluid free surface, and of a density equal to that of the fluid. This device duplicates the effect of adding a large mass to the spindle without actually doing so.

The other class of fluid balancer incorporates multiple circumferentially disposed chambers similar in configuration to those employed in the illustrated embodiment of the present invention. In the usual case the chambers do not communicate with one another, but with annular grooves, one groove per chamber. Stationary nozzles direct jets of fluid into adjacent grooves to fill respective chambers. Upon entering a chamber the fluid cannot be removed except by stopping the spindle and allowing the fluid to fall out by gravity. This is an open-cycle and irreversible process in which balance is necessarily lost at machine shut-down. Occassionally when chambers are completely filled from repeated balancing adjustments, the machine must be deliberately shut down to drain the chambers.

Thus it can be perceived that prior unbalance compensators possess a number of significant limitations.

The present invention is directed to a new and improved unbalance compensator which is unencumbered by limitations of prior unbalance compensators. The invention possesses a number of features not found in prior unbalance compensators, and these features endow the unbalance compensator with capabilities which have been unavailable in prior devices.

The preferred embodiment disclosed herein is of a spindle-mounted, fluid type unbalance compensator of closed-loop, multiple chamber design. The balancing mass may be transferred between balancing chambers via transfer tubes without loss of balance when the machine is stopped. The fluid balancing mass is not moved as a body, but rather is transferred as a vapor between chambers via the transfer tubes, and this makes possible precise balance corrections while retaining high correction capacity. The absence of moving weights and associated mechanisms permits operation at speeds limited only by structural strength considerations.

The balancing chambers are arranged circumferentially around the body of the compensator in a symmetrical fashion. Balancing mass is transferred between opposite chambers by creating a temperature differential between fluids contained in the respective chambers. The temperature differential gives rise to a higher vapor pressure in a warmer chamber creating vapor flow through the transfer tube to an opposite cooler chamber where the transferred vapor condenses.

The port ends of the transfer tubes are located in their respective chambers in such a manner as to prevent liquid fluid from entering and passing through a tube into an opposite chamber whether the compensator is rotating or stopped at any particular angular position. Thus the liquid fluid is essentially restricted to the chambers while only vapor is allowed to move between chambers.

The creation of a temperature difference between fluids in opposing chambers may be by either a heating means, a cooling means or a combination of both. The heating and/or cooling means may be electrical in nature such as resistance heating or Peltier Effect cooling. Heat transfer between the chambers and the surrounding environment is promoted by inclusion of fins or convolutions which are exposed to the ambient environment on the exterior of the chambers. Where electric current is utilized for electric heating or cooling means, one embodiment of the invention discloses the use of slip rings to conduct electric current to the rotating compensator from a remote power supply. In another embodiment the unbalance compensator of the present invention employs an air-gap coupling between stationary and rotary portions with electric power being inductively transferred across the air-gap. As a further alternative, the power could originate from a battery mounted on the rotating portion of the unbalance compensator.

Control of the heating and/or cooling of fluid, and hence control of vapor transfer, is accomplished through the use of an associated control, preferably electronic. The electronic control receives input signals relating to spindle conditions and acts upon these input signals to develop output signals for controlling the heating and/or cooling means which in turn controls the vapor transfer between chambers. In the embodiment where slip rings are used, these signals are conducted via the slip rings. In the embodiment where an air-gap coupling is used, the signals are inductively transferred across the air-gap via a sending coil on the stationary portion and a receiving coil on the rotating portion. One of the input signals is developed from a vibration sensor which monitors vibration to provide an indication of the imbalance condition. Another input provides information as to the instantaneous angular rotational position of the spindle. The electronic control acts upon these signals to determine the chambers between which vapor should be transferred and in which direction the vapor should be transferred.

This application discloses an example of a preferred electronic control which is well-suited for use with a four-chamber system. Principles of the preferred electronic control system are applicable to other embodiments as well. A particular advantage of the embodiment which utilizes an air-gap for tranmsmitting electrical power and signals between the stationary and the rotary portions of the unbalance compensator is that the compensator may have an annular construction. This allows the unbalance compensator to be positioned over a spindle or shaft with the spindle or shaft projecting centrally through the aperture defined by the annular shape of the unbalance compensator. Hence the invention may be used in applications where it is impossible or undesirable for a compensator to be mounted on the end of a spindle or shaft without the spindle or shaft protruding through the compensator.

The use of electronic control circuitry promotes reliability, rapid response, and contributes significantly to greater precision in operation so imbalance can be corrected in its incipiency. While the use of electronic controls is preferred, it is not essential that the control be of an electronic character. The control may utilize switches, relays or other signal responsive means for controlling the vapor transfer. Such control signals may be electromagnetic, acoustic or of other non-mechanical character to obviate direct physical contact of non-rotating elements with the compensator. Where the machine with which the unbalance compensator of the invention is used is a production machine for producing production parts, the present invention contributes to improved accuracy and quality of the production parts. By minimizing vibration, machine life may also be prolonged.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENTS

Figure 1:
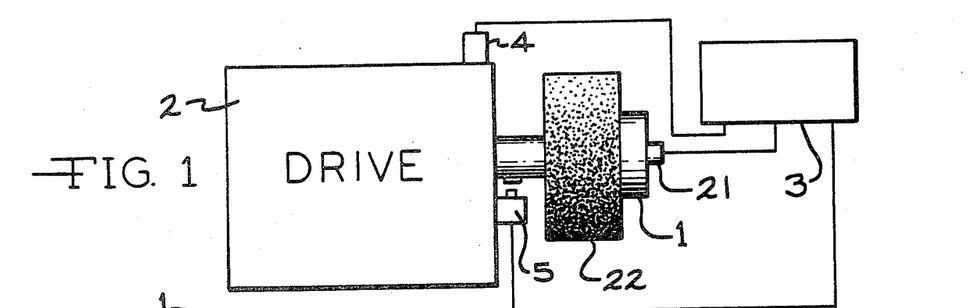
FIG. 1 is a diagram illustrating one embodiment of the unbalance compensator of the present invention in use with a grinding machine.

FIG. 1 shows schematically a typical application of one embodiment of the invention on a grinding machine. Compensator 1 is mounted adjacent to grinding wheel 22. Vibration transducer 4 and proximity sensor 5 provide vibration magnitude and spindle positional signals respectively to electronic instrument 3. Instrument 3 indicates the location and amount of unbalance in wheel 22. The proper compensator chamber is selected and controlled automatically by instrument 3 as shown in FIG. 1.

Figures 2, 4, 7:
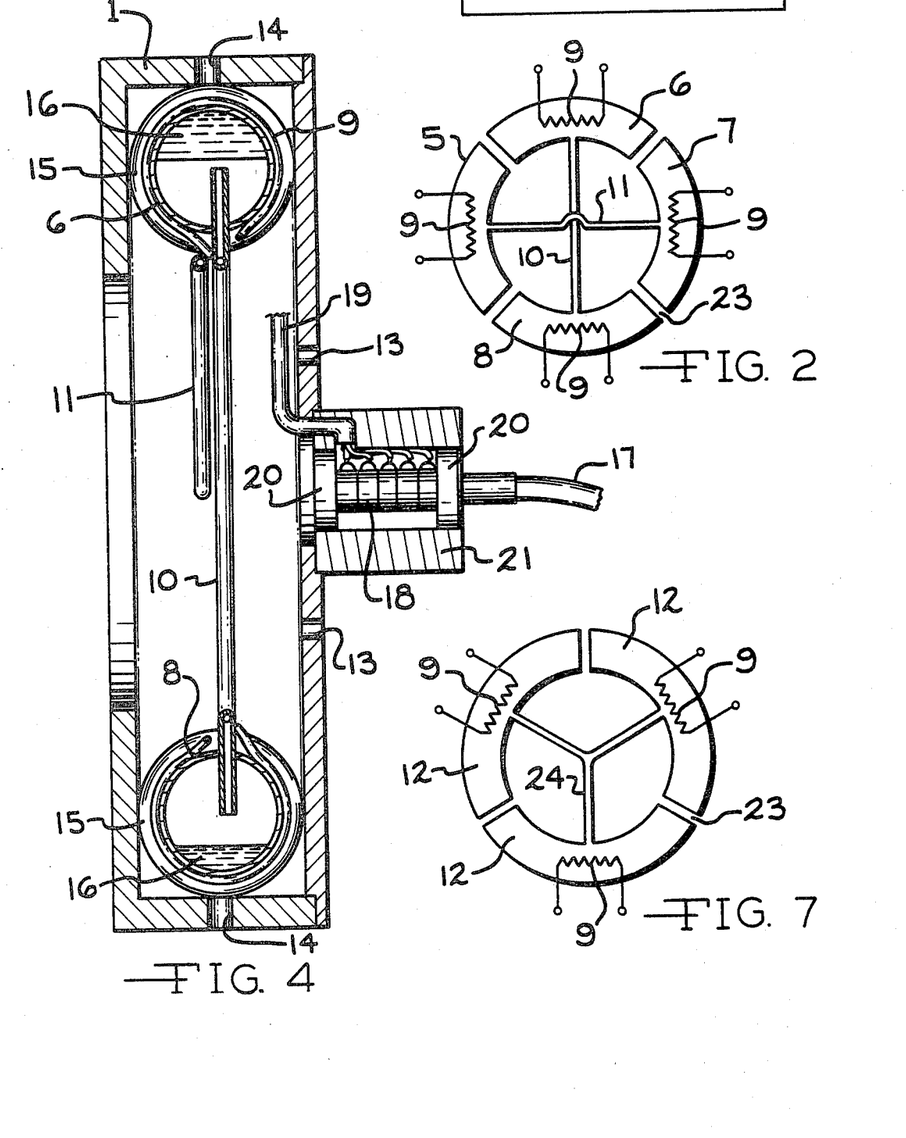
FIG. 2 is a diagram illustrating schematically one portion of the unbalance compensator of FIG. 1.
FIG. 4 is a diametrical cross sectional view taken in the direction of arrows 4—4 in FIG. 3.
FIG. 7 is a diagram similar to FIG. 2 illustrating another embodiment.

Schematic diagrams of a four chamber and a three chamber compensator configuration are shown in FIG. 2 and FIG. 7 respectively. Partitions 23 define end boundaries of the chambers. Heating elements 9 permit heating individual chambers independently of other chambers.

In FIG. 2 opposite chambers 6 and 8 communicate vapor therebetween via transfer tube 10. Similarly, chambers 5 and 7 communicate through tube 11. FIG. 7 shows an alternate embodiment where all chambers are in mutual communication through transfer tubes 24.

Figures 3, 5, 6:
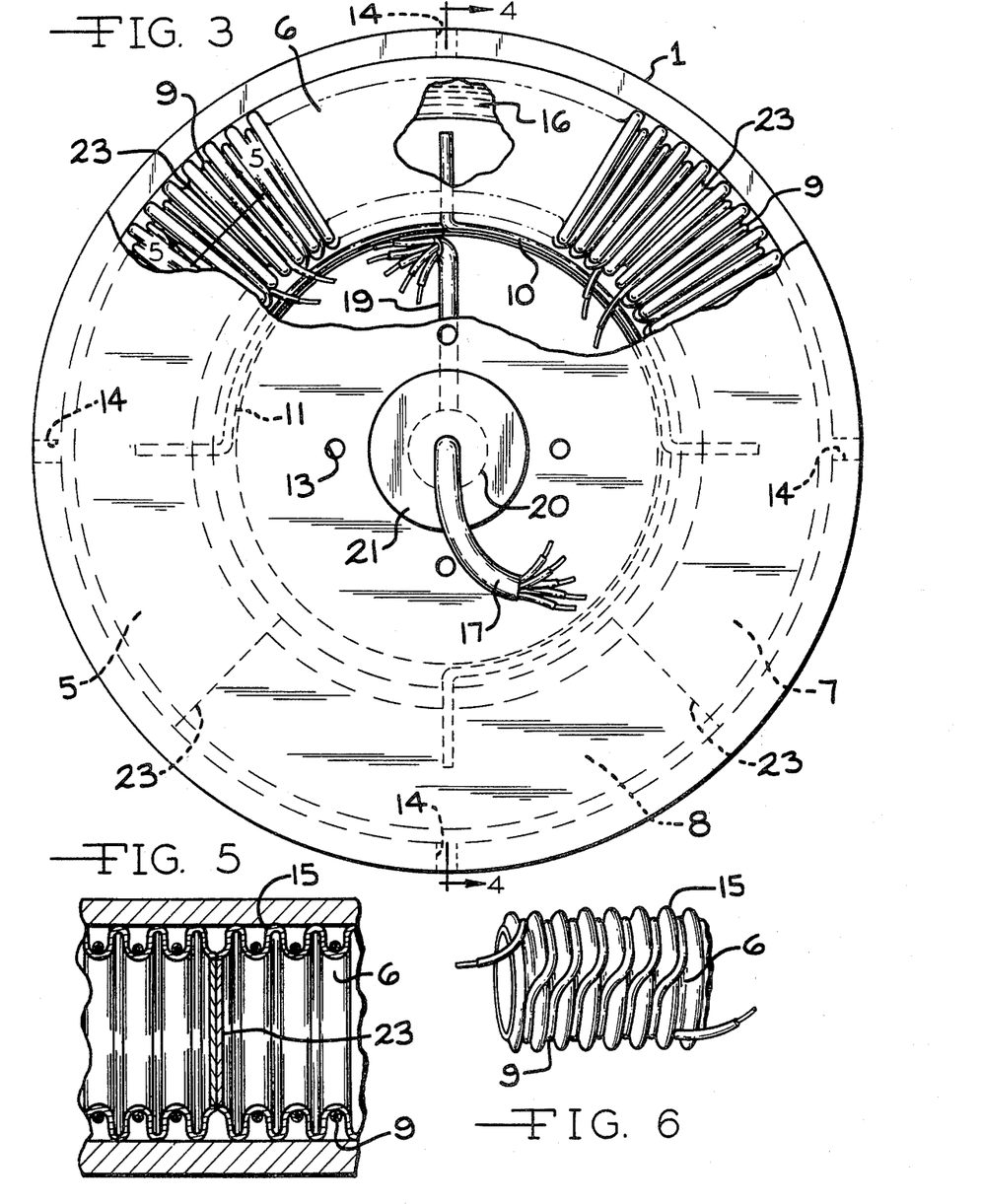
FIG. 3 is an enlarged end view of the unbalance compensator of FIG. 1 having portions broken away.
FIG. 5 is an enlarged fragmentary sectional view taken in the direction of arrows 5—5 in FIG. 3.
FIG. 6 is a perspective view of one element of the unbalance compensator of FIG. 3 shown by itself.

FIG. 3 and FIG. 4 show transverse and axial views respectively of the type of configuration represented in FIG. 2. Referring to FIG. 4, opposing chambers 6 and 8 consist of corrugated metal hose, shown in greater detail in FIGS. 5 and 6. Chamber convolutions 15 provide increased heat transfer surface area in contact with balancing fluid 16 internally and with the surrounding medium, usually air, externally. Heating element wire 9, sheathed with electrical insulation, wraps spirally around the chambers between the convolutions. Element leads are bundled in cable 19 which terminates at brushes contacting slip-rings 18. The slip-rings ride in bearings 20 supported by slip-ring housing 21 mounted on the end face of compensator housing 1. The brushes rotate with the compensator while the rings remain stationary. Leads from the stationary slip-rings are contained in cable 17 connected to a power supply and control means (not shown in FIG. 4). Holes 13 and 14, having a difference in radial spacing, serve to pump the surrounding medium such as air around the chambers for heat dissipation purposes.

FIGS. 3 and 4 clearly show how transfer tubes 10 and 11 terminate with open ends located near the three-dimensional geometric centers of the chambers. Fluid 16 only partially fills the chamber system such that under no conditions is it possible for any chamber to contain fluid filling more than half the total volume thereof. Thus the surface level of fluid 16 never reaches the open ends of transfer tubes 10 and 11 whether the compensator is rotating or at stand-still. The chamber volume not occupied by fluid also functions as a vapor condenser with heat dissipation surface area provided by convolutions 15.

It should be understood that the above description of operation and construction of the unbalance compensator indicates only one of several possible methods for transferring balancing mass in a balancing device where such mass transfer utilizes the principle of vaporization and condensation of the balancing mass and therefore should not necessarily be construed to be limited to the illustrated method for implementing said principle. Any means such as heating, cooling, ultrasonics, chemical or other means for achieving vaporization and redistributing spatially such mass in a balancing device lies within the purview and scope of this patent.

The invention may be practiced independently of the specific type of control, such as the instrument 3, which is used in association with the unbalance compensator shown in FIG. 1. Hence principles of the invention in one respect are independent of any specific control means. However, as will be seen from the further ensuing description, a specific preferred example of control means is disclosed herein and it constitutes a further aspect of the invention.

Figures 8, 11:
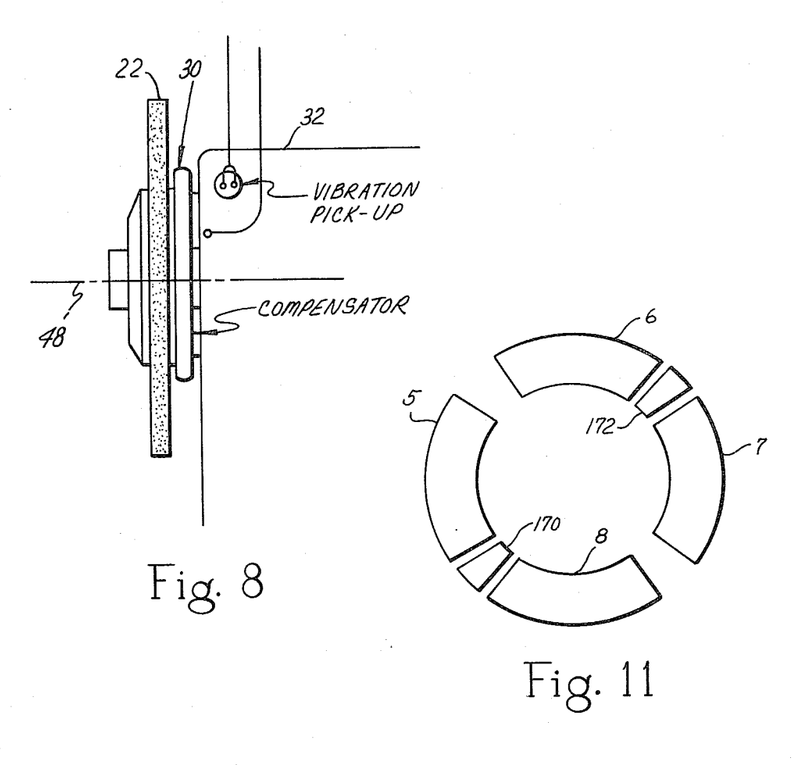
FIG. 8 is a fragmentary view illustrating a further embodiment of unbalance compensator in use with a grinding machine.
FIG. 11 is a diagram, similar to FIGS. 2 and 7, but for the unbalance compensator of FIG. 8.

FIG. 8 shows an embodiment of unbalance compensator 30 mounted on a grinding machine 32. The unbalance compensator 30 differs from that of the previous embodiment in that it is of full annular shape having a central through-aperture as will be seen from the description of FIG. 9. The full annular shape of the unbalance compensator 30 allows it to be used on machines where it is either impossible or undesirable to mount the unbalance compensator directly on the end of a shaft, spindle, or other rotary member as was the case in FIG. 1. Hence in the FIG. 8 embodiment the machine spindle can pass through the central through-aperture of the unbalance compensator 30 allowing the unbalance compensator to be disposed between the grinding wheel 22 and the drive.

Figure 9:
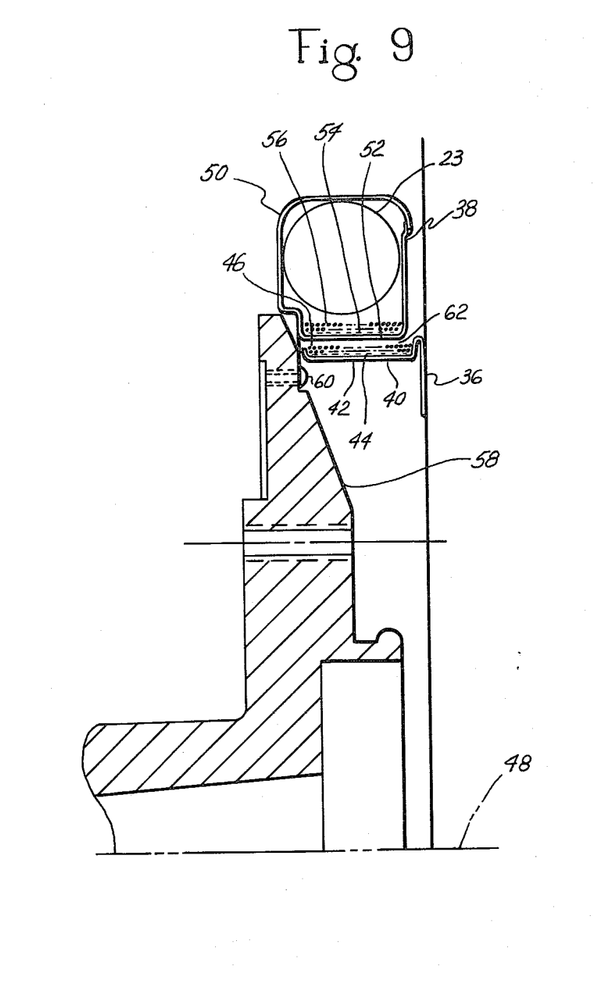
FIG. 9 is an enlarged radial sectional view through the unbalance compensator of FIG. 8.

FIG. 9 illustrates further detail of the unbalance compensator 30. The unbalance compensator comprises an annular stationary portion designated by the general reference numeral 36 and an annular rotary portion designated by the general reference numeral 38. In the illustrated construction the stationary portion 36 comprises a frame 40 containing a radially outwardly facing circumferential channel 42. Contained within channel 42 are two separate electrical coils. One electrical coil is a power coil 44 and the other coil is a pulse, or signal, coil 46. The power coil 44 comprises a much larger number of turns than does the signal coil 46, and the power coil is of a heavier gauge conductor. The frame 40 is secured to stationary structure such as the frame of the grinding machine drive. In this way the two coils 44, 46 are supported stationarily on the machine and concentric with the axis of rotation 48.

The rotary portion 38 comprises a frame 50 which is of an annular shape and concentric with respect to axis 48. The frame 50 is constructed to provide a circumferentially extending channel 52 within which are disposed a power coil 54 and a pulse, or signal, coil 56. The frame 50 also contains four chambers 23 corresponding to the four chambers 23 of the first embodiment 1. The frame is secured to a rotary member of machine 32 such as the hub or spindle 58, for example, by means of a series of screws 60 fastening the frame around the outer periphery of hub 58. Hence the coils 54, 56 rotate with the hub. An annular air gap 62 separates the two portions so that the rotary portion 38 is free to rotate about the stationary portion 36 without any mechanical contact. The stationary coils 44 and 46 are supported in radially inwardly spaced relation to the rotary coils 54, 56 with the coils being closely inductively coupled. This construction eliminates the need to use slip-rings and brushes for conducting electric power and signals to the heater elements 9 associated with the chambers 23 as was done in the first embodiment. The purpose of the power coils 44 and 54 is to couple electrical power from the stationary portion to the rotary portion. The purpose of the pulse coils 46 and 56 is to couple electrical signal pulses from the stationary portion to the rotary portion.

Figure 10:
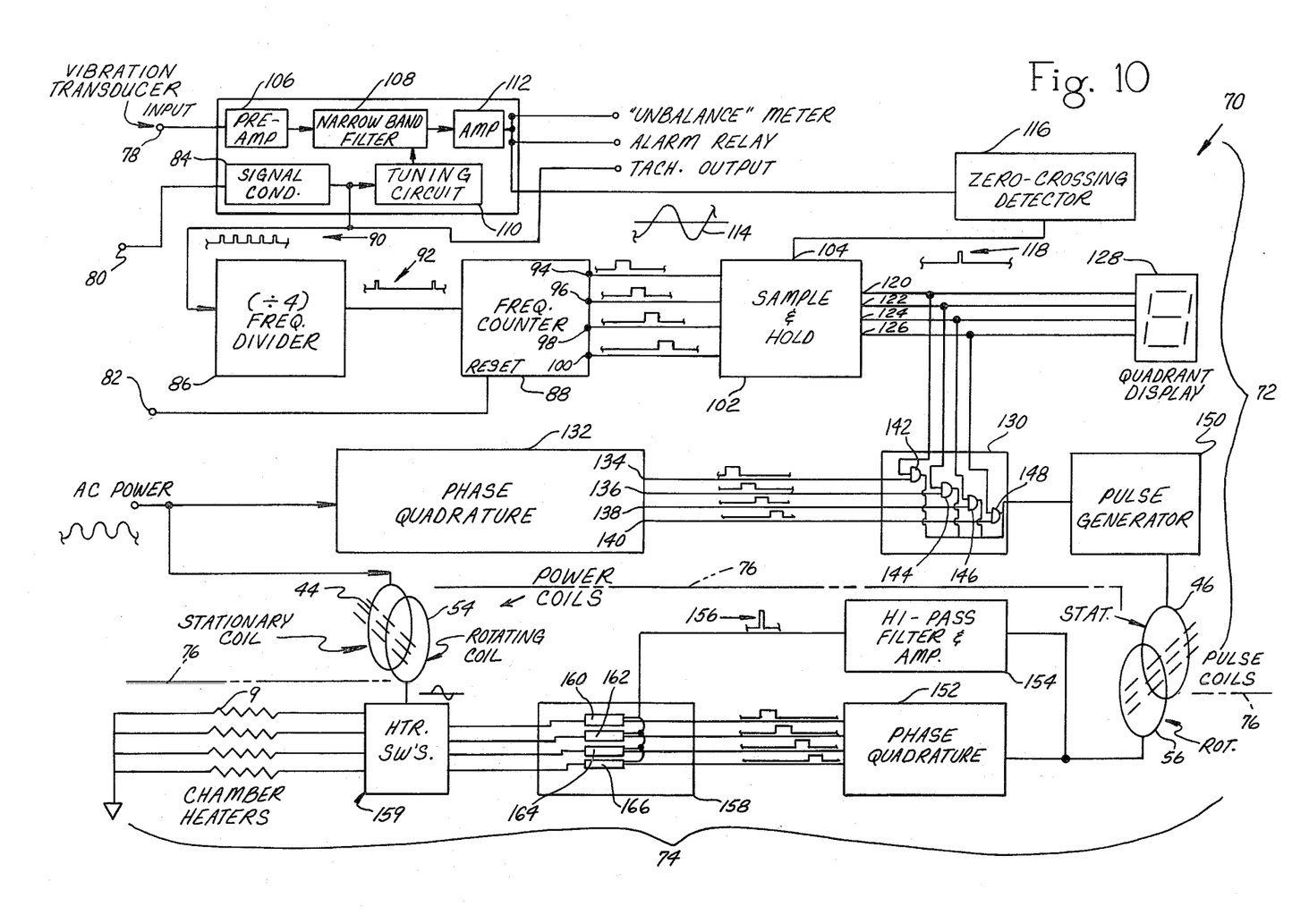
FIG. 10 is a schematic diagram illustrating an electronic control for use with the unbalance compensator.

FIG. 10 illustrates an example of an electronic control 70 which is well suited for use with the unbalance compensator. The control 70 may be considered as comprising a stationary portion 72 and a rotary portion 74. These are separated in the drawing figure by the broken line 76. Briefly, the control 70 receives input signals relating to spindle rotation and acts upon these signals to develop encoded signals which are transmitted from the stationary portion 72 to the rotary portion 74. The rotary portion 74 decodes these signals to in turn control the application of electric power to the heater elements 9 so that the proper heater element is energized to in turn cause the mass vapor transfer necessary to maintain precise balance.

The details of the stationary circuit portion 72 will be considered first. One input of the stationary portion 72 is designated by the reference numeral 78 and is connected to receive the vibration signal from the vibration trasducer 4 which is suitably mounted on the machine to sense vibration caused by imbalance. Further inputs 80, 82 receive spindle shaft position signals. These signals are derived from the position sensor 5 such as was illustrated in FIG. 1. The purpose of the sensor 5 is to provide signals which are indicative of the instantaneous rotational position of the spindle. The sensor in conjunction with a portion of the circuit 72 constitute what is commonly known as a shaft position encoder. The shaft position encoder includes a signal conditioning circuit 84, a frequency divider circuit 86 and a frequency counter circuit 88.

Let it be assumed that the signal channel connected to input terminal 80 provides a waveform consisting of 16 pulses per revolution of the spindle shaft. Hence the pulses are spaced apart at intervals corresponding to $22\frac{1}{2}$ degrees of spindle rotation. The signal conditioning circuit 84 conditions the pulse waveform into a rectangular pulse train 90. The pulse train 90 consists of individual rectangular pulses each spaced apart $22\frac{1}{2}$ degrees of spindle shaft rotation.

The frequency divider circuit 86 divides the frequency of the pulse train 90 by four so that a pulse train 92 is produced in which the individual rectangular pulses are spaced apart 90° of spindle shaft rotation. The frequency divided pulse train 92 is supplied to the count input of frequency counter circuit 88. A reset input of frequency counter 88 is connected to receive the shaft position signal supplied by sensor 5 to terminal 82. This latter signal is a pulse given once per revolution of the spindle shaft. Hence the frequency counter 88 is reset every 360° of rotation of the spindle shaft.

The frequency counter circuit has outputs 94, 96, 98, and 100. Each of these inputs is successively energized in response to pulses of the pulse train 92. If it is considered that the reset pulse occurs at the 0° position of the spindle shaft, then the signal at output 94 provides a pulse during the first 90° of the rotation of the spindle shaft from the 0° position. Similarly, it will be perceived that the remaining outputs 96, 98, 100 provide successive output pulses signal during the second 90°, the third 90°, and the fourth 90° respectively of spindle shaft rotation. In this way signals appearing at the outputs 94, 96, 98 and 100 of the frequency counter circuit are effective to indicate in which quadrant of rotation the spindle shaft is at any particular instant of time.

The four output signals from frequency counter circuit 88 are supplied to corresponding inputs of a sample and hold circuit 102. The sample and hold circuit 102 also receives a further input at a terminal 104. Therefore, before circuit 102 is described in detail, it is appropriate to consider how the signal which is supplied to terminal 104 is developed.

The terminal 78 is connected to receive the vibration signal from the vibration transducer. The vibration transducer may comprise an inductance coil containing a spring-mounted magnetic mass. As vibrations are sensed, the magnetic mass oscillates in relation to the coil in such a manner that the coil provides a sinusoidal output signal whose frequency corresponds exactly to the rotational frequency of the spindle shaft and whose peak amplitude is indicative of the magnitude of vibrations. The phase of the transducer output signal is related however to the circumferential location of imbalance.

The circuit 72 includes a preamplifier stage 106 which receives and amplifies the input signal from the vibration transducer. This amplified vibration transducer signal is then supplied to a tunable narrow band filter circuit 108. The narrow band filter circuit 108 has a tunable center frequency controlled by a tuning circuit 110. The tuning circuit receives the pulse waveform 90 and provides an output signal which is related to the frequency of the pulse waveform 90. This output signal is supplied to the narrow band filter circuit 108 to adjust the center frequency. Because the frequency of waveform 90 is indicative of spindle shaft speed, the center frequency of the narrow band filter is thereby automatically set to the spindle shaft speed. In this way the narrow band filter circuit is continuously tuned to whatever the instantaneous spindle shaft speed happens to be. Because vibrations of interest are at the spindle shaft speed, the amplified vibration signal is passed through the filter circuit 108 to amplifier stage 112.

The amplifier stage 112 is wide band so as to provide amplification over the full range of possible vibration frequencies corresponding to variations in spindle shaft speed. The output signal of amplifier stage 112 may be considered therefore as the unbalance signal indicated by the waveform 114. The unbalance signal will be of a generally sinusoidal character having a frequency corresponding to the instantaneous rotational frequency of the spindle shaft and having a peak amplitude corresponding to the magnitude of vibrations. The information of interest insofar as the present embodiment is concerned is the phase of the zero crossing of the signal from one polarity to the other polarity, for example from positive to negative. The phase of the vibration signal, as noted above, corresponds to the angular position of shaft imbalance. Hence the zero crossing can be used to provide an indication of the angular position of the imbalance.

The signal 114 is therefor supplied as an input to a zero crossing detector circuit 116. The zero crossing detector looks for zero crossings of the signal from one selected polarity to the opposite polarity, and whenever that occurs, the zero crossing detector provides an output pulse signal such as the pulse 118 indicated in the drawing figure. Hence the pulse 118 will be givenm once per revolution of the spindle shaft and its phase will indicate the angular location of the imbalance in the rotating mechanism.

The sample and hold circuit 102 can now be considered in detail. It comprises four output terminals 120, 122, 124, and 126 each of which corresponds to one of the inputs received from frequency counter 88. The sample and hold circuit 102 may be considered as comprising four individual sample and hold circuits each of which is associated with a corresponding input received from circuit 88 and a corresponding output 120, 122, 124, 126. The zero crossing detector pulse signal 118 is supplied to each of the four individual sample and hold circuits. The operation of circuit 102 is such that when the zero crossing pulse 118 is given, that input line which is receiving the quadrant signal from frequency counter 88 will cause the corresponding output 120, 122, 124, 126 to be energized. The individual sample and hold circuits maintain this status until the next occurrence of the zero crossing pulse 118. Hence so long as the zero crossing pulse 118 continues to be given during a particular quadrant of rotation, then the corresponding output 120, 122, 124, 126 remains activated. Whenever the phase of the zero crossing pulse 118 changes to a new quadrant then the output 120, 122, 124 and 126 corresponding to that new quadrant is activated. A visual display 128 is connected to the outputs 120, 122, 124 and 126 to provide a visual display of which quadrant signal is being given. As will be seen, this display is useful in set-up of the system at initial installation as well as during operation.

The outputs 120, 122, 124 and 126 sample and hold 102 are also connected to corresponding inputs of a circuit 130 which is referred to as a one-of-four selector circuit. This selector circuit 130 is used toward creating the pulse signal which is transmitted by the stationary pulse coil to the rotary pulse coil. Additional circuitry is associated with selector circuit 130. This additional circuitry includes a phase quadrature circuit 132 which has four outputs 134, 136, 138, and 140 coupled to corresponding inputs of selector circuit 130. The phase quadrature circuit 132 develops output waveforms at the outputs 134, 136, 138, and 140 which are related to the phase of the electrical power waveform. Sinusoidal AC power is a conventional power source, and is used in the present embodiment, being supplied as the input to circuit 132. The phase quadrature circuit comprises conventional construction and develops at each output 134, 136, 138, 140 a rectangular pulse signal whose duration corresponds to a particular quadrature of the power signal. For example the output 134 provides a rectangular pulse which occurs between 0° and 90° of the sinusoidal waveform; output 136 provides a rectangular pulse occurring between 90° and 180°; output 138 provides a rectangular pulse which occurs between 180° and 270°; and output 140 provides a rectangular pulse which occurs between 270° and 360°.

Each of the outputs of the phase quadrature circuit is associated with a corresponding individual circuit of the selector circuit 130. In the disclosed embodiment these individual circuits are AND logic circuits 142, 144, 146, 148. The respective output signals of the phase quadrature circuit serve to gate the AND circuits 142, 144, 146, 148 in repetitive sequential order. Thus circuit 142 is gated from 0° to 90° of the power signal; circuit 144 from 90° to 180°; circuit 146 from 180° to 270°; and circuit 148 from 270° to 360°. The outputs of the AND circuits are connected in common. Hence the arrangement is such that an output pulse of 90° duration will be provided by selector circuit 130 once per cycle of the power signal frequency. The phase of this 90° signal will be a function of the signal received from sample and hold circuit 102. Hence if the imbalance is detected in the first quadrant of the rotation, then the output pulse of selector circuit 130 is given during the first 90° of the power signal. If the imbalance is in the second quadrant, the signal is given during the second 90°; if the imbalance is in the third quadrant, the signal is given during the third 90°; and if the imbalance is in the fourth quadrant, the signal is given during the last 90°.

The output signal from selector circuit 130 is supplied as an input to a pulse generator circuit 150. The pulse generator circuit is responsive to the leading edge of the rectangular input signal from selector circuit 130, and hence it can be understood that the phase of the pulse output of pulse generator 150 is related to the phase of the power signal in the same manner as the zero crossing signal. Hence the phase of the pulse output signal of pulse generator 150 indicates which quadrant of spindle rotation is experiencing the imbalance. Stated more generally the stationary circuit may be considered as providing a modulated output signal containing the information as to the angular location of imbalance.

The pulse generator output is coupled to the stationary pulse coil 46. The pulse signal is coupled across the air-gap 62 to the rotary pulse coil 56. In this way the pulse delivered to the stationary pulse coil induces a corresponding pulse in the rotary pulse coil 56.

The rotary portion 74 includes circuitry for decoding the modulated pulse signal so that the correct heater element is activated. The circuitry may be arranged on the rotary portion of the compensator in a manner which will hereinafter be described in connection with the description of FIG. 11. The circuitry includes a phase quadrature circuit 152 and a high pass filter and amplifier circuit 154. Because of the mutual inductance coupling between the four coils 44, 46, 54, 56 the actual signal induced in the rotary pulse coil 56 contains, in addition to the pulse component, a power supply component. The high pass filter and amplifier 154 has a frequency response characteristic which rejects the power supply component and passes only the pulse signal component. Hence the high pass filter and amplifier circuit 154 provides a pulse output signal 156 corresponding to the pulse generated by pulse generator 150.

The phase quadrature circuit 152 is basically the same as phase quadrature circuit 132. The phase quadrature circuit has four outputs which provide respective 90° rectangular pulse signals which are in phased relationship to the phase of the power supply signal. These signals are supplied to a sample and hold circuit 158. The illustrated sample and hold circuit 158 comprises four individual sample and hold circuits which are disclosed as flip-flops 160, 162, 164, 166. Each of the flip-flop circuits has one input connected to receive a corresponding one of the signals from the phase quadrature circuit 152. The other inputs of the flip-flops are connected in common to receive the pulse signal 156.

The flip-flops may be conventional D-type circuits. Each operates in such a manner that each time that its clock input is pulsed, it will clock through to a data output the data signal which is present at its D input. This signal remains at the output until the next clocking. The clock terminals of the flip-flops are connected in common to receive the pulse signal 156. With this arrangement one of the flip-flops assumes a different state from the other three during each cycle of the power supply signal, the particular one which is different corresponding to the phase of the pulse signal 156. Hence the flip-flops provide output signals indicative of which quadrant of the spindle is experiencing imbalance. The status of the flip-flops remains unchanged until imbalance in a new quadrant is detected at which time the condition changes. In this way the outputs from the sample and hold circuit 158 will be used to selectively energize the heater elements of the individual chambers 23.

The circuitry on the rotary portion 74 further includes four power switches, generally designated by the reference numeral 159, each associated with a corresponding heater element. Power for the heater elements is conducted across the air-gap 62 via the mutually inductively coupled power coils 44, 54. The power input is supplied to the heater switches and the particular heater switch which is activated will cause electric power to flow to the selected heater element. Each of the power switches is coupled with a corresponding one of the flip-flops 160, 162, 164, 166. In this way the correct switch is activated so that the correct heater element to counteract the imbalance is energized. The heater element which is energized heats the fluid and causes vapor to be transmitted by the transfer tube to the opposite chamber where it condenses. This process will continue until the imbalance has been corrected. The heater switches may be any suitable device. MOSFETS are presently preferred.

One way of effectively operating the unbalance compensator is to continue to energize a heater element even after correction has taken place. Thus there will be a certain amount of overshoot which will give rise to a need to correct in another quadrant. In this way the imbalance compensator operates in a continuous manner to heat a selected one of the chambers until a subsequent chamber is selected for heating. In this way fine adjustments are continuously being made to the balancing mass whereby the balance is maintained within a very precise tolerance.

The particular mounting of the circuit components on the rotary portion is shown in FIG. 11. The heater switches may be packaged in a module 170 which is located between two of the chambers. The remainder of the circuitry is packaged in another module 172 which is located diametrically opposite the first module between adjacent chambers. With this procedure the mounting of the components on the rotary portion does not contribute significantly to imbalance. Any imbalance which it may contribute will be automatically corrected by the compensator when the system is put to operation.

In fabricating an unbalance compensator in accordance with principles of the invention, the structure is designed to withstand the centrifugal forces over the full range of rotational speeds which are expected. The individual elements which are mounted on the frame of the rotary portion 38 should be of sufficient strength and securely mounted. Because it will be necessary to electrically connect the components of the two modules 170, 172, as well as the rotary coils 54, 56, the interconnecting wiring should be suitably secured on the frame against movement. The circuitry for the control 70 also includes power supply circuits (not shown in the drawings) which convert the AC power into suitable DC power levels for the individual electronic circuits. These power supply circuits may be of any particular conventional construction.

The control which has just been described possesses important advantages over other types of controls. In particular the present control is superior to one in which different frequencies are used for selecting the particular quadrant. Frequency converter circuits would be required to decode the different frequencies and these would be relatively expensive circuits. Moreover depending upon the channel bandwidth, capacitance changes with aging and elevated temperatures could produce excessive frequency drifts in the quadrant detectors and filters. Because the installation of the compensator may often comprise large masses of steel or other conductive material in the vicinity and because such masses act to short circuit electrical signals, the electrical signals must have sufficient power to penetrate this shielding effect. Another possible method for remotely controlling the quadrants would employ sensors such as photocells, magnetic or Hall Effect devices. Dirt contamination of photocells in industrial environments rules out their use as a practical matter. Other sensors such as those mentioned are proximity devices where close alignment is critical. On certain types of machines the spindle axis oscillates axially making permanent alignment impossible in practice. The signalling technique of the present circuit possesses substantial penetrating power yet also possesses a low total power consumption. Because the pulse width of the pulse transmitted by the pulse coil 46 has a very narrow width, say on the order of 20 microseconds, its instantaneous power may be very high, for example 500 watts. Hence 500 watts of penetrating power is available yet because of the short duration the total power consumption is very low, say for example 0.01 watts. Also the narrow pulse width corresponding to a high frequency involves the use of a relatively low inductance sending-receiving circuit. Therefore separate coils of only several turns are wound on the primary and secondary power coils.

The encoding-decoding technique of the present control is also advantageous. This technique may be considered as an absolute quadrature encoder-decoder system. Quadrature means that four different functions may be controlled. Absolute means that selection of a particular function is not dependent on its sequence in a counting series. No specific reset or reference point is required; the selection is absolute and independent. Because the sinusoidal waveform conditioned by the decoder is the same as used by the encoder a synchronous relationship is assured. The sine wave can be of any frequency without requiring changes or adjustments in the encoder-decoder system. Power factor phase shift as normally occurs in any transformer is compensated by a phase shifting capacitor in the encoding circuit. The same phase shifting means may also be used to place the pulse signal toward the middle of a pulse, away from the leading edge to assure turn-on and reduce the requirement of exact 90° pulse widths in both encoder and decoder.

The quadrant display readout 128 is particularly useful at the time of initial installation of the unbalance compensator on a machine. Because the control is of a closed-loop nature, it must be ensured that the feedback is of a negative, or non-regenerative, character so that the desired control takes place. Such assurance can be obtained by a procedure involving placement of deliberate imbalance at a particular angular location in relation to the defined quadrants, say for example at the common junction of quadrants three and four. If the control is properly phased, then the display on readout 128 changes back and forth between the numbers three and four. If such is not the case, then a different condition is observed on the readout display. Proper phasing is obtained by adjusting the phase of the once per revolution pulse at terminal 82. In the present embodiment the means for generation of this once per revolution pulse comprises a pin which is circumferentially positionable on the rotary shaft at 22½ angular increments. Hence this pin may be repositioned to the appropriate one of the 16 different angular positions so that the desired response is observed on the display readout. Depending upon the particular readout display it may be necessary to perform one or several repositionings of the marker pin on the shaft before the final position is ascertained.

While it is possible for the unbalance compensator to be continuously operational while a particular machine is in use, it will be recognized that in certain types of machines, continuous use may not be appropriate. In those cases it may be desirable to balance the machine by running the unbalance compensator for a predetermine period of time before the machine is put to its intended use. For example this might well be the case in the illustrated application of the unbalance compensator to a grinding machine. The use of the grinding machine in grinding operations may give rise to vibrations which would constitute spurious signals which should not be acted upon by the unbalance compensator. Hence depending upon a particular machine the unbalance compensator may be operated at certain intervals of use of the machine to correct any imbalance. Because the unbalance compensator of the invention does not transfer the balance mass unless the heating elements are energized, the unbalance mass, once distributed properly, will remain in that condition. Such will be the case even if the machine is stopped at intervals between usages of the imbalance compensator.

In fabricating an unbalance compensator pursuant to the invention it is desirable that the fluid mass be as dense as possible and that it be a substance whose vapor pressure at room temperature is below atmospheric pressure. In this way fluid will not leak from the system in the event that a pin hole, crack or the like were to occur in the otherwise closed circuit. The fluid should also have a low heat of vaporization and a low specific heat. These will promote quick response as well as minimum energy requirements. By way of example the chambers may be 1½ inches in diameter and may be on the order of 1 foot long. For such a chamber the heating element should have a rating on the order of 200 to 300 watts. The electrical circuitry and components would be sized accordingly. The unbalance compensator may be fabricated by conventional fabrication techniques. Desirably high quality materials such as stainless steel are used for the chambers. The assembly fabrication may also involve techniques such as soldering or TIG welding. Once the mechanical structure has been fabricated the balancing mass may be introduced by puncturing the system with a needle and injecting the balancing mass through the needle into the balance chambers. The needle is thereafter removed and the hole created thereby closed, for example by soldering or welding. During the introduction of the balancing mass the chambers should be heated so that a saturated condition exists. This will drive off any air, water vapor or other material in the system so that the system ultimately contains essentially only the balancing mass fluid. When the heated fluid is cooled after the system has been closed, the vapor pressure will drop below atmospheric for example to approximately 5 PSI. A suitable fluid for the balancing mass is Dupont's FREON 113 or equivalent.

Additional features which are incorporated in the system include tachometer, unbalance meter, and alarm relay features. Because the waveform 90 represents rotational speed it may be used as an input to a tachometer to provide a visual display of speed. Because the waveform 114 represents unbalance it may be used as an input to an unbalance meter to provide a visual display of unbalance, and it may also be monitored by an alarm relay to provide an alarm signal when unbalance exceeds a predetermined magnitude. The tachometer and the unbalance meter may comprise a common display with suitable switching of the inputs.

While a presently preferred embodiment of the invention has been disclosed, it will be appreciated that principles of the invention in its various aspects may be incorporated into other embodiments.

What is claimed:

1. In a machine having a rotary mass including a spindle shaft containing two axially spaced apart mass portions requiring balancing, an unbalance compensator having a central through-aperture extending between two opposite axial ends thereof, means mounting the unbalance compensator on the rotary mass with the spindle shaft passing through the through-aperture so that one of said mass portions of the rotary mass requiring balancing is disposed adjacent one of said opposite axial ends of the unbalance compensator, and the other of said mass portions is disposed adjacent the other of said opposite axial ends, wherein the unbalance compensator comprises a rotary portion mounted on the rotary mass and a stationary portion, and including an air gap between the stationary and rotary portions allowing the rotary portion to rotate free of contact with the stationary portion, and wherein said stationary and rotary portions comprises respective electrical coils concentrically arranged and inductively coupled.

2. The invention set forth in claim 1 wherein the rotary portion comprises a power coil and a signal coil and the stationary portion comprises a power coil and a signal coil and further including means connected with the coils of the stationary portion for providing electrical power input to the power coil of the stationary portion and electrical control signals for the signal coil of the stationary portion, the power coil of the rotary portion being coupled inductively across the air gap with the power coil of the stationary portion so that electrical power is transmitted across the air gap from the power coil of the stationary portion to the power coil of the rotary portion, and the two signal coils being inductively coupled across the air gap so that the control signals which are supplied to the signal coil of the stationary portion are transmitted across the air gap to the signal coil of the rotary portion, said unbalance compensator comprising balance mass means which are redistributed on the rotary portion of the unbalance compensator by means of the power and control signals which are received in the power and and signal coils of the rotary portion.

3. For a machine having a rotary mass requiring balancing, an unbalance compensator comprising a rotary portion adapted to be mounted on the rotary mass requiring balancing, said unbalance compensator further comprising a stationary portion, balancing mass means on the rotary portion, distribution means for distributing the balance mass means on the rotary portion so as to correct for imbalance, an air gap separating the stationary and rotary portions allowing the rotary portion to rotate without contacting the stationary portion, and control means for the distribution means, said control means comprising transmitting means on the stationary portion, receiving means on the rotary portion separate from said balance mass means, and means for transmitting energy across the air gap from the transmitting means to the receiving means.

4. An unbalance compensator as set forth in claim 3 in which the transmitting means comprises a pair of coils constituting a power coil and a signal coil and said receiving means comprises a pair of coils constituting a power coil and a signal coil, said two power coils being operatively coupled via the air gap such that power input to the power coil of the transmitting means is transmitted across the air gap to the power coil of the receiving means, said two signal coils being operatively coupled across the air gap such that control signals supplied to the signal coil of the transmitting means are transmitted across the air gap to the signal coil of the receiving means.

5. An unbalance compensator as set forth in claim 4 wherein said control means also includes encoding means for encoding said control signals with reference to the power input to the power coil of said transmitting means and decoding means for decoding the encoded signals received by the signal coil of said receiving means with reference to the power received by the power coil of said receiving means.

6. An unbalance compensator as set forth in claim 5 in which the distribution means comprises uniformly circumferentially spaced chambers on the rotary portion, transfer tubes connecting opposite chambers, the balancing mass means comprises a balance fluid possessing liquid and vapor phases, heat transfer elements associated with each chamber, and means for selectively activating said heat transfer elements in accordance with the decoded control signals so as to create a thermal differential between opposite chambers which will cause balance fluid to pass as a vapor through a transfer tube between opposite chambers in a sense which will correct for imbalance.

7. An unbalance compensator as set forth in claim 6 in which the decoding means is contained in a circuit module disposed between adjacent chambers and the control means includes switch means which is selectively actuated to selectively connect the heat transfer elements with the power coil of said receiving means in accordance with the decoded control signals, said switch means being contained in a circuit module located between adjacent chambers opposite the first circuit module.

8. An unbalance compensator as set forth in claim 6 in which there are four chambers, the power input to the power coil of said transmitting means is of sinusoidal form, said encoding means comprises means for encoding the control signals with reference to a particular quadrature of the sinusoidal power input, and said decoding means comprises means for decoding the encoded signals with reference to a particular quadrature of the sinusoidal power induced in the power coil of said receiving means so that the correct vapor transfer of balance mass fluid is caused to occur.

9. An unbalance compensator as set forth in claim 5 in which the encoding means comprises means for producing a pulse input to the signal coil of the transmitting means whose phase contains the correction information.

10. An unbalance compensator as set forth in claim 5 in which the encoding means receives input signals from a shaft position encoder sensing rotation of the rotary mass and from a vibration sensor sensing vibration due to imbalance of the rotary mass.

11. For a machine having a rotary mass requiring balancing, an unbalance compensator comprising a rotary portion adapted to be mounted on the rotary mass requiring balancing and a stationary portion, said rotary portion including balance mass means which is distributed on the rotary portion to maintain balance, control means for controlling the distribution of the balance mass means, said control means comprising means for encoding correction information for correction of imbalance, an air gap separating said rotary and stationary portions, decoding means on the rotary portion separate from said balance mass means, and means for transmitting encoded information across the air gap to said decoding means, said decoding means comprising means for decoding the encoded information so that the balance mass is distributed in accordance with the correction information contained in the encoded information.

12. An unbalance compensator as set forth in claim 11 in which the transmitting means comprises a pair of coils constituting a power coil and a signal coil and said decoding means comprises receiving means comprises a pair of coils constituting a power coil and signal coil, said two power coils being operatively coupled via the air gap such that power input to the power coil of the transmitting means is transmitted across the air gap to the power coil of the receiving means, said encoded information being supplied to the signal coil of said stationary portion, and said two signal coils being operatively coupled across the air gap such that said encoded information is transmitted across the air gap to the signal coil of the receiving means.

13. An unbalance compensator as set forth in claim 12 wherein said encoding means comprises means for encoding said correction information with reference to the power input to the power coil of said transmitting means and said decoding means comprise means for decoding the encoded information received by the signal coil of said receiving means with reference to the power received by the power coil of said receiving means.

14. An unbalance compensator as set forth in claim 13 including distribution means on the rotary portion which comprises uniformly circumferentially spaced chambers on the rotary portion, transfer tubes connecting opposite chambers, the balance mass means comprises a balance fluid possessing liquid and vapor phases, heat transfer elements associated with each chamber, and means for selectively activating said heat transfer elements in accordance with the decoded information so as to create a thermal differential between opposite chambers which will cause balance fluid to pass as a vapor through a transfer tube between opposite chambers in a sense which will correct for imbalance.

15. An unbalance compensator set forth in claim 13 in which the input waveform to the power coil of said transmitting means is of sinusoidal form causing a waveform also of sinusoidal form to be induced in the power coil of said receiving means said encoding means comprises means for encoding the correction information with reference to particular portions of the sinusoidal waveform input to the power coil of said transmitting means and said decoding means comprises means for decoding the encoded correction information received by the signal coil of said receiving means with reference to particular portions of the sinusoidal waveform induced in the power coil of said receiving means.

16. An unbalance compensator as set forth in claim 15 in which the encoding means receives input signals from a shaft position encoder sensing rotational position of the rotary mass and from a vibration sensor sensing vibration due to imbalance of the rotary mass, said encoding means comprising means for developing the correction information from said input signals.

17. For an unbalance compensator which is used to balance a rotary mass requiring balancing, said unbalance compensator including balance mass means which is distributed with respect to the rotary mass to maintain balance, a control system for controlling the distribution of said balance mass means, said control system comprising means for encoding correction information for correction of imbalance, decoding means for decoding the correction information from the encoded correction information, means for transmitting the encoded correction information from said encoding means to said decoding means, said decoding means comprising means separate from said balance mass means for decoding the encoded information and controlling distribution of said balance mass means so that the balance mass means is distributed on the rotary mass in accordance with the decoded correction information.

18. A control system as set forth in claim 17 in which the encoding means receives input signals related to rotary position of the rotary mass and to vibrations indicative of imbalance, said encoding means comprising signal processing means for processing the input signals, said signal processing means comprising means developing from said input signals a correction signal indicative of imbalance in which the phase of the correction signal is related to the angular location of the imbalance of the rotating mass.

19. A control system as set forth in claim 18 in which said signal processing means comprises a narrow band filter whose center frequency is tuned to the instantaneous rotational speed of the rotary mass so as to pass vibration signals substantially only at a frequency corresponding to the instantaneous rotational speed of the rotary mass, and a zero crossing detector coupled to receive the filtered vibration signal and provide a signal in accordance with a zero crossing of the filtered vibration signal, the correction information being contained in the signal provided by the zero crossing detector.

20. A control system as set forth in claim 19 wherein said encoding means includes means for relating the signal from the zero crossing detector to one of predetermined angular segments of the rotary mass, said encoding means comprising means for causing said transmitting means to transmit a particular correction signal so long as the signal from the zero crossing detector corresponds to a position of imbalance anywhere within an angular segment of the rotary mass corresponding to a particular one of the predetermined angular segments of the rotary mass.

21. A control system as set forth in claim 20 including means providing a sinusoidal signal and wherein the particular correction signal transmitted by said transmitting means is related to the phase of the sinusoidal signal and said transmitting means includes a pulse generator circuit which provides an output pulse corresponding to the particular relation between the zero crossing detector signal and the phase of the sinusoidal signal.

22. A control system as set forth in claim 21 wherein decoding means comprises means providing a second sinusoidal signal whose phase is correlated with that of the first-mentioned sinusoidal signal and means for controlling the distribution of the balance mass means in accordance with the relation of the pulse signal received by said decoding means to the phase of the second sinusoidal signal.

23. A control system as set forth in claim 22 further including an air gap separating the decoding means and encoding means, said transmitting means including inductance coils associated respectively with the decoding means and the encoding means with said coils being inductively coupled across the air gap, said second sinusoidal signal being induced in said decoding means by the first sinusoidal signal, said pulse signal being transmitted across the air gap, said decoding means including a high pass filter circuit for passing the pulse signal and for rejecting the sinusoidal signal.

24. A control system as set forth in claim 23 wherein said decoding means includes a plurality of switches and means for selectively actuating said switches in accordance with the particular relationship of the phase of the pulse signal passed by the high pass filter circuit in relation to the phase of the second sinusoidal signal.

25. In a spindle-mounted balancer, a plurality of circumferentially disposed chambers partially filled with fluid having liquid and vapor phases and serving as a distributable balancing mass, said chambers being connected by suitable conduit means to allow free flow of vapor of said fluid between chambers, and means to create a differential condition between said chambers, said chambers and said conduit means being organized and arranged such that in response to said differential condition, vapor of said fluid passes through said conduit means unaccompanied by liquid.

26. In a spindle-mounted balancer, a plurality of circumferentially disposed chambers partially filled with a vaporizable liquid serving as a distributable balancing mass, said chambers being connected by suitable conduit means to allow free flow of vapor of said liquid between said chambers, said chambers being provided with means to create vapor pressure differential between said chambers, the organization and arrangement of said chambers and said conduit means being such that said vapor pressure differential is effective to induce balancing mass transfer between said chambers by flow of vapor of said liquid through said conduit means unaccompanied by flow of liquid through said conduit means.

27. In a spindle-mounted balancer according to claim 26, said means to create vapor pressure differential between said chambers comprising means for creating a temperature differential between said chambers.

28. In a spindle-mounted balancer according to claim 27, said chambers being fabricated with fins to facilitate transfer of heat between the interior of said chambers and a surrounding medium.

29. In an apparatus as in claim 27, said chambers being fabricated of convoluted tubing the convolutions thereof providing a large surface area to both said liquid and said vapor inside said chambers and to ambient medium external to said chambers.

30. In an apparatus as in claim 27, electric heating element wire, suitably electrically insulated, wrapped spirally around said chambers for the purpose of heating said liquid contained therein.

31. In a spindle-mounted balancer as set forth in claim 26, said plurality of circumferentially disposed chambers being arranged in a uniform circumferential pattern.

32. In a spindle-mounted balancer as set forth in claim 31, said plurality of circumferentially disposed chambers comprising four such chambers arranged at 90° intervals, said conduit means comprising two separate conduits, one of said conduits connecting two of said chambers which are 180° apart and the other of said conduits connecting the remaining two chambers.

33. In a spindle-mounted balancer as set forth in claim 31, said plurality of circumferentially disposed chambers comprising three chambers disposed at 120° intervals, said conduit means being common to said three chambers.

34. A method of distributing balancing mass in a spindle-mounted balancer having a plurality of circumferentially disposed chambers comprising partially filling said chambers with a vaporizable liquid serving as a distributable balancing mass, communicating said chambers by suitable conduit means to allow free flow of vapor of said liquid between said chambers, creating vapor pressure differential between said chambers to induce vaporous balancing mass transfer between said chambers by flow of vapor of said liquid through said conduit means unaccompanied by flow of liquid through said conduit means.

35. In a spindle-mounted balancer, a plurality of circumferentially disposed chambers, conduit means commonly connecting said chambers to allow free flow of vapor of a liquid between said chambers, said conduit means having for each chamber a port end disposed substantially at a three dimensional geometric center of each said chamber, means for creating a vapor pressure differential between said chambers, the organization and arrangement of said chambers and said conduit means being such that said vapor pressure differential is effective to induce vaporous balancing mass transfer between said chambers by flow of vapor of said liquid through said conduit means and wherein the total amount of liquid in said chambers and conduits does not exceed one half the total volume of any one of said chambers.

* * * * *